United States Patent [19]
Strubbe

[11] Patent Number: 5,223,924
[45] Date of Patent: Jun. 29, 1993

[54] SYSTEM AND METHOD FOR AUTOMATICALLY CORRELATING USER PREFERENCES WITH A T.V. PROGRAM INFORMATION DATABASE

[75] Inventor: Hugo J. Strubbe, Yorktown Heights, N.Y.

[73] Assignee: North American Philips Corporation, New York, N.Y.

[21] Appl. No.: 889,201

[22] Filed: May 27, 1992

[51] Int. Cl.⁵ .............................................. H04N 7/10
[52] U.S. Cl. ..................................... 358/86; 358/84; 455/5.1
[58] Field of Search ............... 358/84, 86; 455/3.1, 455/4.2, 5.1, 186.1, 186.2

[56] References Cited

U.S. PATENT DOCUMENTS 4,706,121  11/1987  Young .
4,751,578   6/1988  Reiter et al. ................. 358/183
4,977,455  12/1990  Young .
5,047,867   9/1991  Strubbe et al. ................ 358/335
5,093,718   3/1992  Hoarty et al. .

OTHER PUBLICATIONS

Stanfill; Parallel Free-Text Search on the Connection Machine System; Comm. of the ACM; pp. 1229-1239; vol. 29, #12, Dec. 1986.
"Insight Telecast", pp. 1-11.

Primary Examiner—Reinhard J. Eisenzopf
Assistant Examiner—Philip J. Sobutka
Attorney, Agent, or Firm—Michael E. Marion

[57] ABSTRACT

A user interface which can access downloaded TV program information, which can be continually updated and provided either "over the air", over cable or satellite transmission paths or other "fast data" paths, and automatically correlate this information with the preferences of the user, to create and display at least one program information database based upon the results of the correlation.

2 Claims, 5 Drawing Sheets

SYSTEM AND METHOD FOR AUTOMATICALLY CORRELATING USER PREFERENCES WITH A T.V. PROGRAM INFORMATION DATABASE

BACKGROUND OF THE INVENTION

The instant invention relates to an improved television interface system which utilizes a TV program information database.

U.S. Pat. No. 4,047,867 described an interface for a TV-VCR system which enabled the user to enter information concerning the user's favorite television programs. Such information can include program name, broadcast channel, starting time, length, repeat pattern and whether the user wanted the program recorded. The patent further described an interface system in which such information could be provided in an intuitive and easy manner through the television receiver's display. The teachings of this patent are incorporated by reference herein.

Television systems utilizing downloadable TV program information have been described, for example, by Insight Telecast, Inc. and in U.S. Pat. Nos. 4,751,578; 4,706,121 and 4,977,455, which are incorporated by reference herein. Using these systems, TV program information can be downloaded and stored in a memory to be displayed on the television display. U.S. Pat. No. 5,093,718 describes a system which can provide such information, including graphics and interactive options, over a "fast data" path which can be a cable, fiber optic or satellite system. These references are incorporated by reference herein.

In the December, 1986 issue of "Communications of the ACM" (Vol. 29, No. 12, pp. 1229-1239), in an article by Stanfill and Kahle entitled "Parallel Free-Text Search On The Connection Machine System", the method known as "free text search" is described which details a method in which seed words are located which can be used to correlate information provided in one or more portions of text. The teachings of this article are incorporated by reference herein. An overview of this subject is provided by the book "Automatic Text Processing" by Salton.

An object of the instant invention is to provide a user interface which can access downloaded TV program information, which can be continually updated and provided either "over the air", over cable or satellite transmission paths or other "fast data" paths, and to automatically correlate this information with the preferences of the user, to create at least one program information database based upon the results of the correlation.

SUMMARY OF THE INVENTION

One embodiment of the invention comprises an interface system which can be used with a television transmission system which provides, along with television programming, updatable TV program information which can, for example, include text summaries of the television programs scheduled for the coming week. In particular, the interface system can comprise a television receiver, a video cassette recorder, and a processor which can be used in conjunction with a digital transmission system which might carry compressed audio/video data as well as miscellaneous data which can include the TV program information. In a preferred embodiment, the processor utilizes "free text" search techniques to correlate the TV program information with the viewer's preferences.

Another embodiment of the invention comprises a system and method which in addition to correlating the TV program information with the preferences of the user, comprises means for creating a customized TV program database, containing only programs of interest to the viewer, and displaying this information as part of the television display. This information can comprise title, channel, category, day, time, length, repeat rate etc., as well as summaries, ratings, recommendations and cost for each of the programs featured. In addition, where a wide band or fast data channel is used to provide this information, video pictures and graphics related to the program information can also be provided.

DETAILED DESCRIPTION OF A PREFERRED EMBODIMENT OF THE INVENTION

The embodiment of the invention described herein provides many of the features first described in U.S. Pat. No. 5,047,867 which is owned by the assignee of the instant application and which has common inventorship with the instant application. The '867 patent describes the manner in which portions of memory can be used to store various categories of programming information. For example, a first memory portion can store, in the form of a database, information related to future television programs as well as information concerning those programs which are preferred by the user. By accessing this database, the user can display "Future Programs" as well as "Favorite Broadcast Programs" using a system of advanced menus and displays and an expanded channel ring. The techniques for providing information from specific databases to the user, described in the '867 application can be readily adapted to the display requirements of the instant invention and are incorporated by reference herein.

Figure 1:
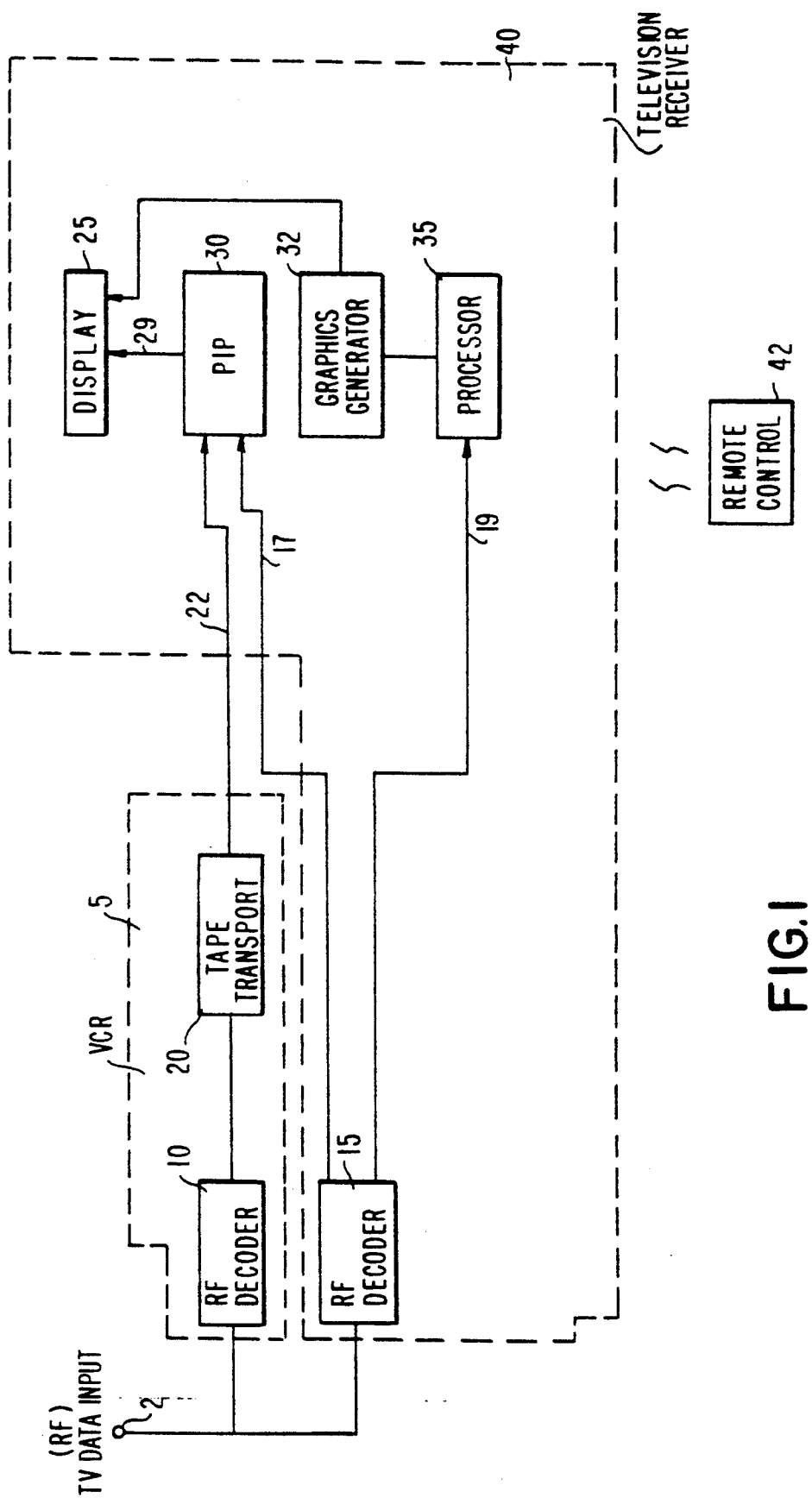
FIG. 1 is a block diagram of a system comprising a preferred embodiment of the invention.

FIG. 1 describes in block diagram form, a preferred embodiment of the invention. In this embodiment, it is assumed that program material as well as data describing future programming, is provided via a digital transmission system which carries compressed audio/video data (for example using the MPEG and MUSICAM formats) together with data for providing in text and graphic form, information about television shows scheduled for the forthcoming week (or any other convenient period of time). This information is updated periodically.

The arrangement described in FIG. 1 is for example only, and it should be understood that the various block elements shown can be separate, or integrated into larger apparatus as shown, and still be within the province of the invention.

Digital data comprising A/V (audio/video television programs) as well as PID (programming information data) are provided to the system at input 2. As described in the references incorporated herein, this data can be provided as an RF signal either "over the air" or by cable, fiber optic, satellite or other appropriate means of delivery for such information. For purposes of this description, we will assume that the digital data is provided by a wideband or "fast digital" data channel thereby permitting the PID to include text and pictorial information related to upcoming television programs.

In the embodiment of the invention shown, a VCR 5 is used in conjunction with a television receiver 40. Both the VCR 5 and the receiver have RF decoders, 10 and 15 respectively, which allow a combined display via PIP (picture in picture) circuit 30, of two decoded signals, or a combination of an "off the air" signal decoded by RF decoder 15, and a stored program provided by tape transport 20.

Remote control 42 is used by the viewer to control the VCR 5 and receiver 40 in known fashion, and also provides input keys with which the viewer can indicate "liked" or "disliked" programs during the browsing mode as described below.

Each of the decoders functions to demodulate and decode or otherwise process the A/V data, as described in more detail below. The output of RF decoder 10 can be recorded by tape transport 20, or passed on to receiver 40 via an auxiliary input 22 to receiver 40.

RF decoder 15, separates the PID data provided by the RF signal input and provides the PID data to processor 35. The A/V data decoded by RF decoder 15 is switchably coupled, via input 17, to PIP circuit 30 which is a known device which can provide two program sources and switch input programming between main and PIP display formats, to display 25. The PID data is processed by processor 35, as described in detail below, in conjunction with graphics generator 32, to provide a text or graphic output which can be combined with the output of PIP 30 in display 25.

Figure 2:
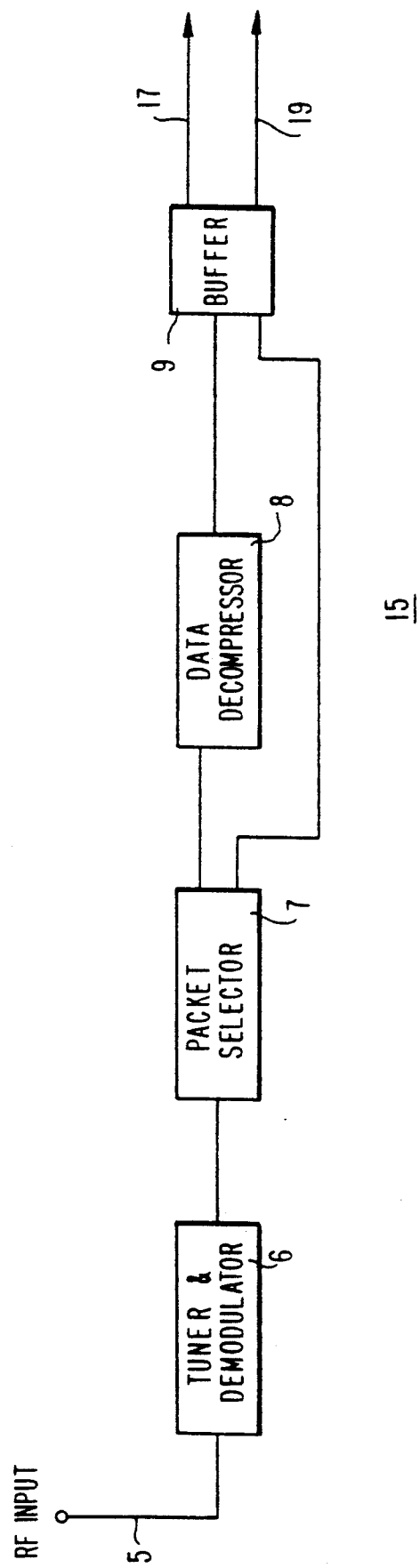
FIG. 2 is a block diagram describing one of the RD decoders shown in FIG. 1.

FIG. 2 is a more detailed block diagram of RF decoder 15. RF decoder 10 can be identical to RF decoder 15. In a fast data channel, data can be provided in the form of packets comprising the A/V data in compressed form, and the PID data, which can be, in uncompressed form.

The RF signal upon which the digital data is modulated, for example, is provided to tuner and demodulator 6 which demodulates and separates the packets. Packet selector 7, separates the A/V (compressed) packets from the PID packets, using techniques well known in the digital signal processing art, and provides the compressed A/V data packets to data decompressor 8 and PIC data packets to buffer 9. Decompressor 8 decompresses the A/V data to provide audio and video of the television programming, via buffer 9, to PIP circuit 30. It should be stated here that although the A/V data is presented in this example as being digital in form, it could also be analog information, thus eliminating the need for the packet selector (except to separate the PID digital data) and the data decompressor.

The PID data consists of a TV program information data which can contain information about forthcoming television programs arranged, for example in data fields presenting categories of information. In this manner (as described in more detail in the references incorporated herein), title, start time, length, channel number, repeat days, logo or graphic illustration, cost (for pay-per-view), number of restarts (for staggered showings), the time between starts, the type of program (i.e. drama, comedy, movie etc.), and a text summary of the program comprising a description of the program and other information such as critics comments can be provided.

Figure 3:
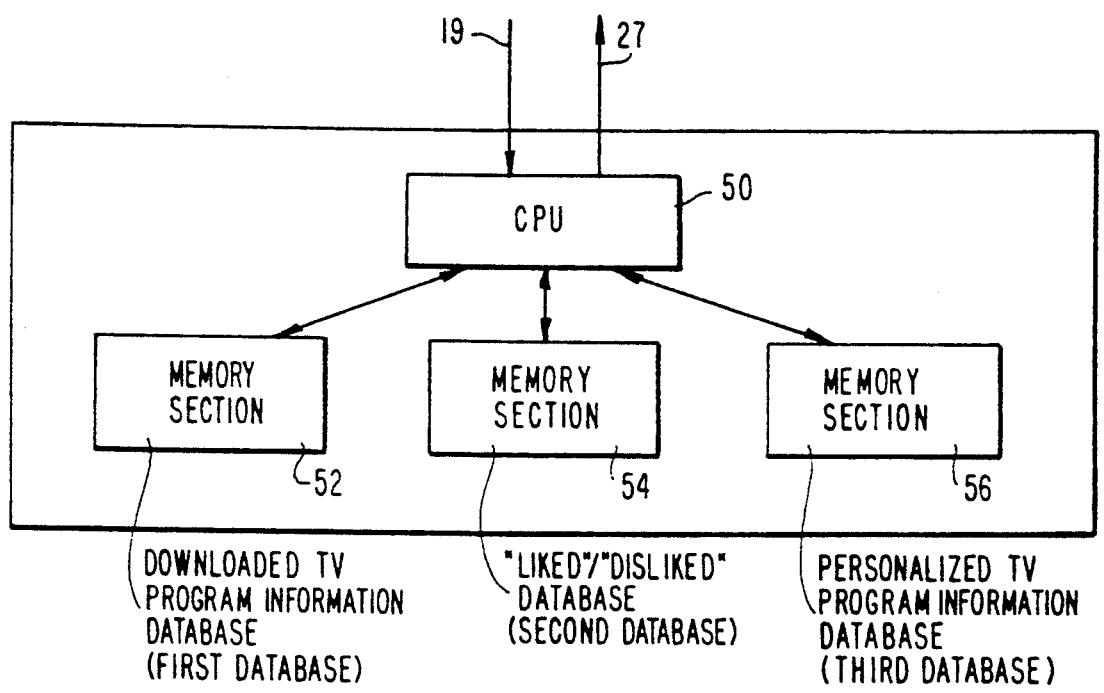
FIG. 3 is a block diagram of the processor shown in FIG. 1.

Processor 35 is shown in more detail in FIG. 3. It comprises a CPU 50, programmed to perform memory addressing functions necessary to set up and control read/write instructions to volatile memory configured into three sections, to contain respectively a first section 52, a second section 54 and a third section 56. CPU 50 also is programmed to accept positive and negative feedback from the viewer via remote control 42, and use this feedback in conjunction with one or more of the memory sections 52, 54, and 56, as described below. In addition, CPU 50 is programmed to perform "free text" search operations as detailed in the Stanfill and Kahle reference incorporated herein, on data stored in one or more of the memory sections 52, 54 or 56.

In the embodiment described herein, memory section 52 is used to store as a first database, the TV program information data records downloaded as PID as described, for example, in the references incorporated herein. Memory section 54 is used to store as a second database, records selected from the first database which are indicated as "liked" by the user (i.e. for which the user provided positive feedback) or "disliked" by the user (i.e. for which the user provided negative feedback).

The '867 patent describes the use of an expanded channel ring and display system to allow a user to browse through a group of records containing program information. These techniques can also be used to display the information stored in the first database (as well as the other databases described below). While in the browsing mode, the viewer can sequentially scan the TV programming information data records stored in the first database, by entering a beginning time (t) and channel (ch). The first database stores the TV programming information in fields so that each record can be accessed by time of day (t) and channel (ch).

Figure 4:
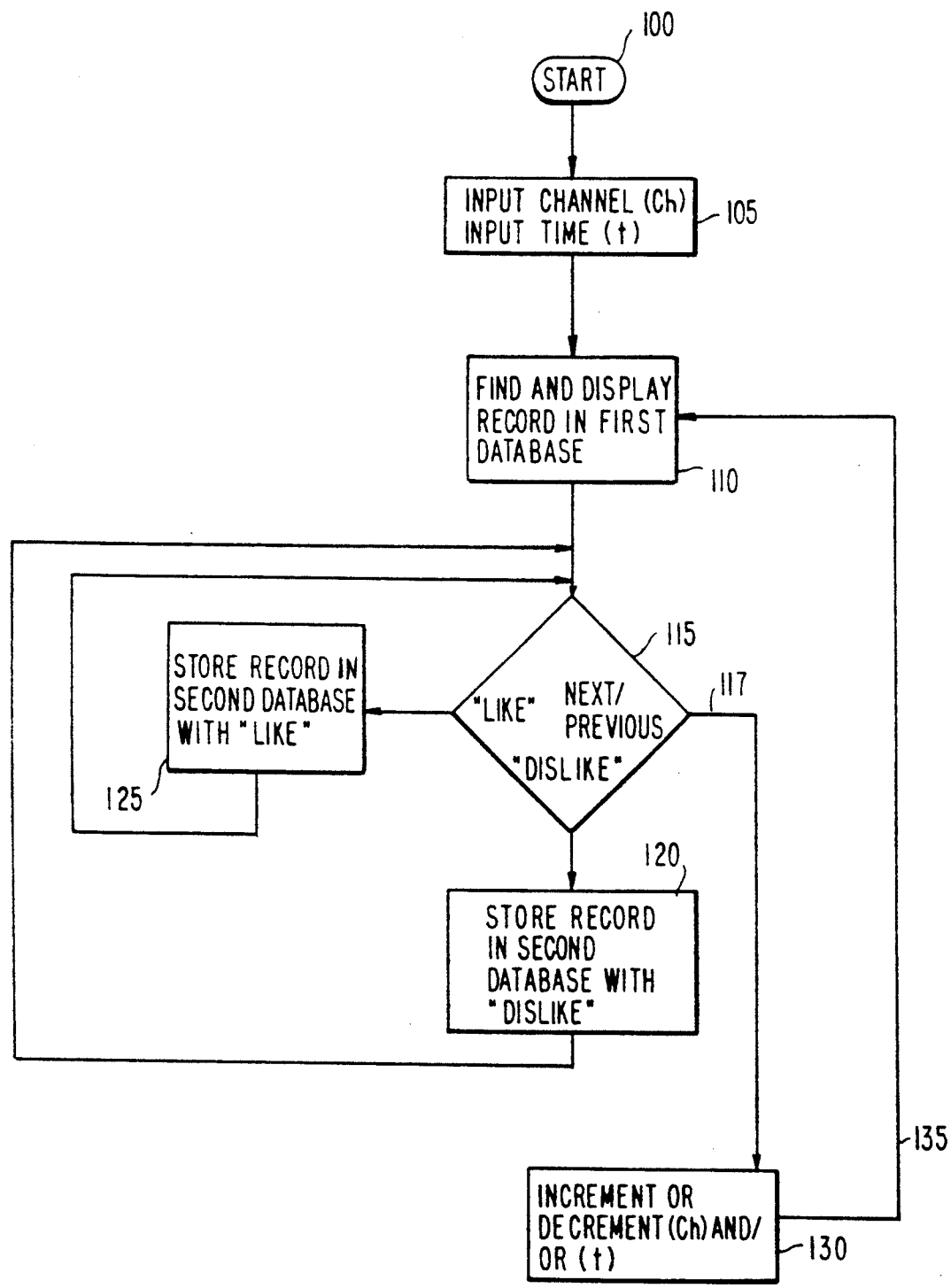
FIG. 4 is a flow diagram illustrating the browsing mode.

FIG. 4 is a flow chart which describes the browsing process. The "liked" or "disliked" indications can be made in several ways. The browsing sequence begins 100 when the viewer presses a "start" or "browse" button on the remote control 42 which directs CPU 50 to begin addressing the first database (i.e. memory section 52). The viewer inputs a channel (ch) and a time of day (t) 105 which is then used to index the TV information data record in the first database having fields which match the chosen (ch) and (t).

In a manner similar to the display processes described in the '867 patent, the information for the chosen data record in first database is displayed 110. The PIP circuit 30 can also be controlled in known fashion by the viewer using remote control 42 and the chosen data record can be displayed as text or graphic information superimposed over the pictures provided by PIP circuit 30, or can replace the picture provided by PIP circuit 30 altogether. These modifications are to be understood as variations of the invention as described herein.

Upon viewing the selected TV programming information record, the viewer can then register whether or not he "likes" or "dislikes" the displayed selection 115. We use the terms "like" and "dislike" to represent any type of positive or negative feedback which the viewer might input. For example, a "like" response could be made by the viewer pressing a button indicating that the program is to be recorded (as described in the '867 patent). It could also simply be made by the keypress of a "like" button on remote control 42. By inputting a "like" response, a flag is set in the record and then stored, along with that record, in the second database (in memory section 54). A negative response by the viewer can similarly be made by pressing a button on the remote control 42 marked "dislike" which would set a corresponding flag in the record which is stored with the record in the second database 120. The aim is to create as the second database 125, a database containing only those records, (i.e. TV programs) selected from the first database, for which the viewer has a clear preference or dislike.

After registering "like" or "dislike" for a displayed record, the user can continue to search records having the same channel at different times of the day (by incrementing or decrementing (t) and keeping (ch) the same) or by searching all records having the same time of day, but different channels (by incrementing or decrementing (ch) and keeping t the same) 130. The newly selected (ch) and/or (t) is then used to find a second record and display it to the viewer 135. If the viewer has no opinion (i.e. neither "like" or "dislike") she can simply press "next/previous" on remote control 42 to select a prior (or subsequent) record 117,130. "Liked" can also be recorded in the second database automatically as the viewer watches and/or records television programs in real time. In other words, at the option of the viewer, merely watching and/or recording a television program for longer than a given amount of time (for example, at least 15 minutes), would automatically register as a "like" response and cause the record in first database corresponding to the selected program, to be stored in the second database 125.

Figure 5:
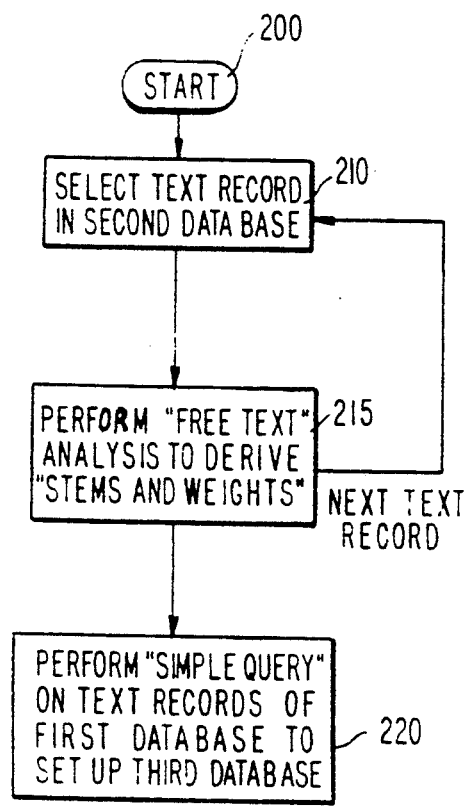
FIG. 5 is a flow diagram illustrating the interest matcher mode.

The purpose of developing the second database, is to enable the user to develop a personalized TV program information database in a third database stored in memory section 56. This third database, could be accessed by the viewer via remote control 42, in order to allow him to select for viewing, only preferred programs which correspond either to forthcoming programs stored in the second database and indicated as "liked", or programs automatically selected from the first database in the interest matcher mode described in FIG. 5.

The user can initiate 200 this process either by pressing the appropriate button remote control 42, or this mode can be initiated by simply turning on the television receiver, or each time the downloaded TV program database is updated.

The field containing the text summary of each record stored in the second database is analyzed in accordance with the "free text" search techniques described and the references incorporated herein 210, 215. Unimportant words like "a", "the" etc are removed. The remaining words are reduced to their stems (i.e. prefixes and suffixes are removed). Each stem in each "liked" record is given a positive weight. Each stem in each "disliked" show, which is not simultaneously a stem in a "liked" show is given a negative weight. With these stems and weights a "simple query" is performed over the records provided from the first database, i.e. the downloaded TV program database.

In the "simple query" 220, every record in the first database is scored (for potential retrieval value) by adding up the weights for the word stems it contains. The total score is then normalized with respect to the length of the respective text record. Additional techniques can be used to speed up this query, in particular, the "surrogate coding" described in the Stanfill & Kahle reference incorporated herein. Those records having the highest retrieval values (i.e. weights) are taken as suggestions and are stored in chronological order along with those records actually flagged by the viewer as "liked", in the third database. The third database can then be accessed by the viewer, as a personalized version of the downloaded TV database initially stored in the first database.

Thus, the invention provides a method for allowing the user to correlate his or her preferences, in an automatic fashion using, for example, "free text" searching techniques, in order to generate a personalized version of a downloaded TV program database.

In case of a two-way interactive system (e.g. two-way cable, telephone system, etc.) the processor and databases of FIG. 3 can be located at the headend (cable company or telephone company), or be distributed between the headend and the TV set.

The first database, 52, can be extended to contain other things than TV shows (e.g. live performances). If their writeup matches the user's interest, they can also be included in the (third) personalized database, 54.

I claim:

1. An apparatus for providing a personalized television program information guide for use in a system comprising means for receiving, storing and displaying an electronic information database comprising summary records of forthcoming television programs, said apparatus comprising:

means for selecting, and indicating preference or dislike for, first selected records of said summary records;

means for storing said first selected records;

means for analyzing said first selected records to isolate first search information;

means for using said first search information to select second selected records from said summary records; and means for storing said second selected records so as to form said personalized television program information guide.

2. The apparatus of claim 1 wherein said analyzing means comprises means for performing a free-text search.

* * * * *